United States Patent
Jonasson

(10) Patent No.: US 6,860,557 B2
(45) Date of Patent: Mar. 1, 2005

(54) FOOTREST FOR A CHILD SAFETY SEAT

(75) Inventor: Lars Jonasson, Norrtalje (SE)

(73) Assignee: LB Invent AB, Vasby (SE)

( * ) Notice: Subject to any disclaimer, the term of this patent is extended or adjusted under 35 U.S.C. 154(b) by 0 days.

(21) Appl. No.: 10/416,716

(22) PCT Filed: Nov. 20, 2001

(86) PCT No.: PCT/SE01/02558
§ 371 (c)(1),
(2), (4) Date: May 14, 2003

(87) PCT Pub. No.: WO02/42114
PCT Pub. Date: May 30, 2002

(65) Prior Publication Data
US 2004/0036331 A1 Feb. 26, 2004

(30) Foreign Application Priority Data
Nov. 21, 2000 (SE) .............................................. 0004255

(51) Int. Cl.⁷ ............................. A47D 1/10; A47C 16/02
(52) U.S. Cl. .................. 297/253; 297/255; 297/256.16; 297/219.12; 297/423.4
(58) Field of Search ................................ 297/255, 253, 297/256.16, 219.12, 423.4

(56) References Cited

U.S. PATENT DOCUMENTS

| | | | | | |
|---|---|---|---|---|---|
| 2,119,023 A | * | 5/1938 | Pickard | ....................... | 297/253 |
| 2,260,352 A | * | 10/1941 | Trapani | ....................... | 297/255 |
| 2,508,822 A | * | 5/1950 | Goldberg | ..................... | 297/255 |
| 2,605,811 A | * | 8/1952 | Zoranovich | .................. | 297/253 |
| 2,663,359 A | * | 12/1953 | Wood | .......................... | 297/253 |
| 2,731,072 A | * | 1/1956 | Post | ....................... | 297/255 X |
| 3,078,101 A | * | 2/1963 | Reese | ............... | 297/219.12 X |
| 3,262,736 A | * | 7/1966 | Merelis | ...................... | 297/253 |
| 3,480,323 A | * | 11/1969 | Propus | ....................... | 297/253 |
| 3,528,701 A | * | 9/1970 | Laughlin | ..................... | 297/253 |
| 3,690,525 A | * | 9/1972 | Koons et al. | ........... | 297/255 X |
| 3,828,994 A | * | 8/1974 | Hollins | .................... | 297/255 X |
| 5,228,745 A | * | 7/1993 | Hazel | ............... | 297/219.12 X |
| 5,549,353 A | * | 8/1996 | Gaudet et al. | ...... | 297/256.16 X |
| 6,237,996 B1 | * | 5/2001 | Chen et al. | .......... | 297/423.4 X |
| 6,318,807 B1 | * | 11/2001 | Perego | ............. | 297/256.16 X |
| 6,561,588 B1 | * | 5/2003 | Brady | ...................... | 297/423.4 |
| 2003/0205921 A1 | * | 11/2003 | McConnell et al. | ... | 297/256.16 |

FOREIGN PATENT DOCUMENTS

| | | | | |
|---|---|---|---|---|
| DE | 41 37 599 A1 | 5/1993 | ............ | 297/236.16 |
| DE | 200 06 291 U1 | 8/2000 | | |

* cited by examiner

Primary Examiner—Rodney B. White
(74) Attorney, Agent, or Firm—Young & Thompson

(57) ABSTRACT

A footrest for a child safety seat (20) includes a support (10) for supporting the lower side of an adherent child safety seat (20) and a footstep (13) that is attached to the support (10). The footstep (13) is adjustable in order to adapt to the length of the legs of the child (21) that is seated in the child safety seat (20). The footrest is equipped with an anchor (12) that is intended to be received in a space (24) between the upper side of an adherent seat (22) and the lower side of an adherent backrest (23) in a vehicle where the footrest is mounted.

7 Claims, 5 Drawing Sheets

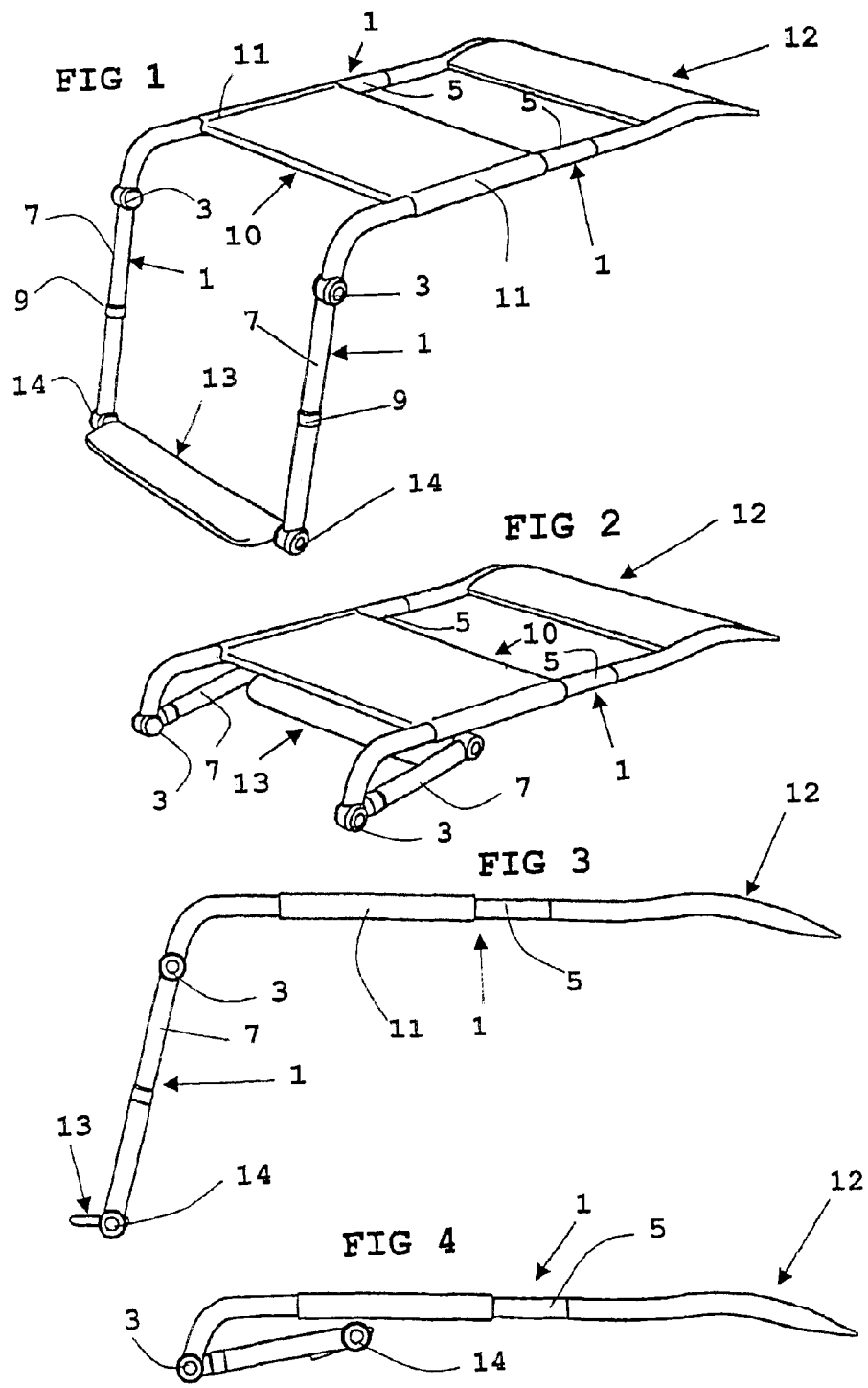

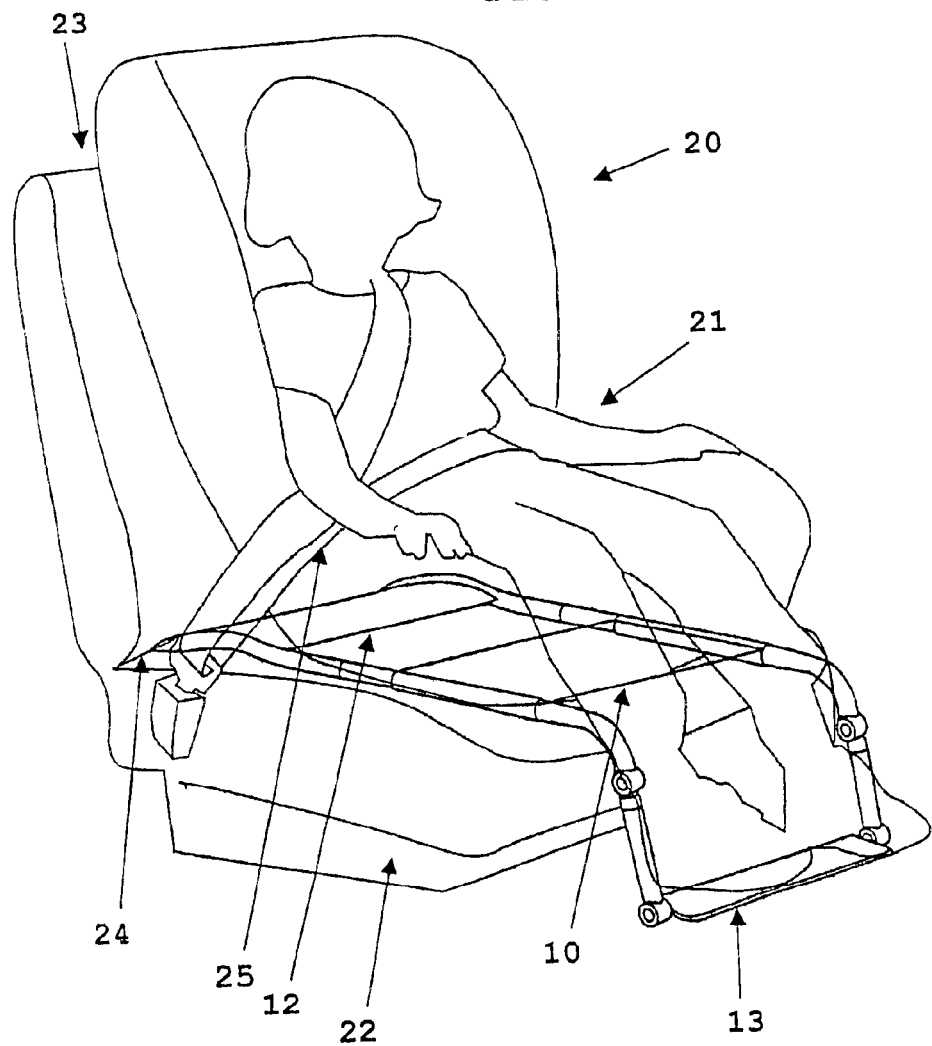

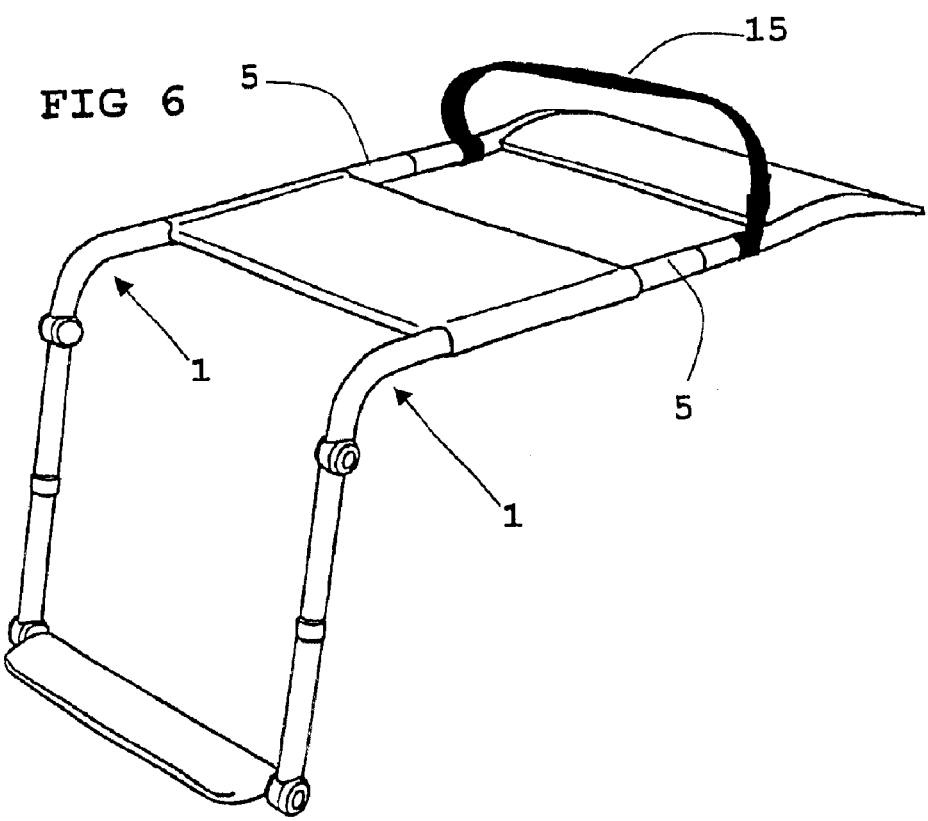

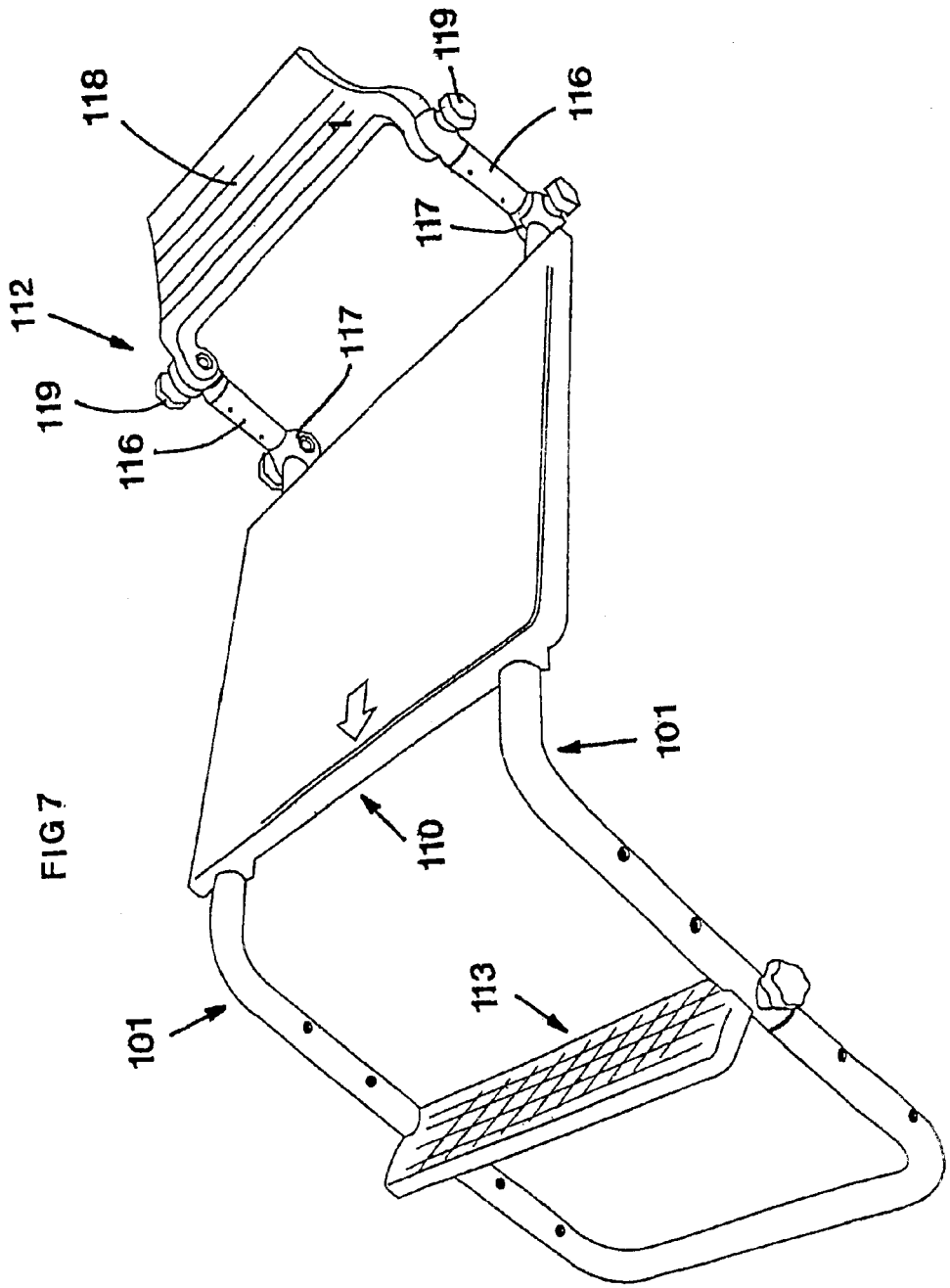

FOOTREST FOR A CHILD SAFETY SEAT

TECHNICAL FIELD OF THE INVENTION

The present invention relates to a footrest for a child safety seat, said footrest comprising a supporting means for supporting the lower side of an adherent child safety seat and a footstep that is attached to the supporting means, and that the footstep is adjustable in order to adapt to the length of the legs of the child that is seated in the child safety seat. The footrest according to the present invention suits child safety seats facing forward.

PRIOR ART

From DE 200 06 291 U1 a footrest is previously known for a child safety seat of the kind defined above. When the child safety seat is placed on top of the supporting means of the footrest and the child is seated in the child safety seat the child, the child safety seat and the footrest are braced by means of the ordinary seat belt of the car. However, this footrest suffers from a serious disadvantage. When the child that is seated in the child safety seat is about to leave the child safety seat the ordinary seat belt of the car is loosened. When the child is descending from the child safety seat it is very likely that the child steps on the footstep of the footrest. This causes the footrest to turn over since the part of the footrest that contacts the seat is not anchored when the seat belt is removed. This is not satisfying from safety reasons since the child may easily be injured in the scenario described above.

OBJECTS AND FEATURES OF THE INVENTION

A primary object of the present invention is to present a footrest of the type defined above, said footrest having a satisfactory anchoring relative to the forces that are present during in principle all phases of use of the footrest.

A further object of the present invention is that the footrest should be simple to mount or dismount.

Still an object of the present invention is that the footrest should suit in principle all child safety seats that are present on the market.

A further object of the present invention is that the footrest should be structurally simple, i.e. simple to manufacture and in principle recyclable in all parts.

BRIEF DESCRIPTION OF THE DRAWINGS

Below embodiments of the invention will be described, reference being made to the accompanying drawings, where:

FIG. 1 shows a perspective view of a first embodiment of a footrest according to the present invention, said footrest being in extended/active position;

FIG. 2 shows a perspective view of the footrest according to FIG. 1 when the footrest is in folded/inactive position;

FIG. 3 shows a side view of the footrest in the position according to FIG. 1;

FIG. 4 shows a side view of the footrest in the position according to FIG. 2;

FIG. 5 shows a perspective view of the footrest according to the invention mounted in connection with a child safety seat;

FIG. 6 shows a modified design of the footrest according to the present invention, said footrest being equipped with a safety belt;

FIG. 7 shows a perspective view of an alternative embodiment of a footrest according to the present invention.

DETAILED DESCRIPTION OF PREFERRED EMBODIMENTS OF THE INVENTION

Figure 8:
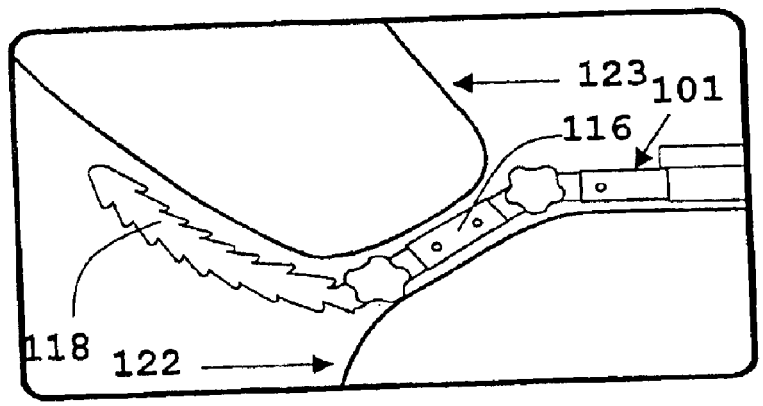
FIG. 8 shows a detail of the arrangement of an anchoring means of the footrest.

The footrest according to the present invention, shown in FIGS. 1–4, comprises two tubular side elements 1 that are parallel to each other and located at a distance from each other. Preferably the side elements 1 constitute metal. As is most evident from FIGS. 1 and 3 the tubular side elements 1 are generally L-shaped in active position.

Each side element 1 has a first hinge 3 that in principle connects a first portion 5 of the side element 1 with a second portion 7 of the side element 1. In the shown embodiment the first portion 5 is intended to rest against the seat in active position and the second portion 7 is intended to extend downwards from the seat in active position. This will be sufficient evident in connection with the description of FIG. 5.

As is evident from FIGS. 2 and 4 the first and the second portions 5 and 7 respectively of a side element 1 may be displaced relative to each other, said portions 5 and 7 in such a case being articulated around the first hinge 3. In FIGS. 2 and 4 the second portion 7 has been articulated around the first hinge 3 to have the second portion 7 extending along the first portion 5.

By studying FIGS. 1–4 it is realised that also the second portion 7 of each side element 1 is telescopic, i.e. two tubes of different diameters being telescopically received in each other. By such an arrangement the length of the second portion 7 is continuously adjustable. In order to lock the two tubes relative to each other in a certain position the second portion 7 being equipped with a manually activated locking means 9 that is designed in suitable way.

In an intermediate part of the first portions 5 of each side element 1, said portions 5 being mutually connected by means of a plate shaped supporting means 10 that is connected to the first portions 5 of the side elements 1 in a suitable way. The plate shaped supporting means 10 may preferably be manufactured from plastic and the plate shaped supporting means 10 may be equipped with hook shaped gripping means 11 along opposite edges, said gripping means may be snapped on the first portions 5 of the tubular side elements 1. Preferably, the plate shaped supporting means is manufactured from a material that establishes proper friction against the lower side of an adherent child safety seat 20, see FIG. 5, the footrest being intended to cooperate with said child safety seat.

At the ends of the first portions 5 of the side elements 1, said ends facing away from the adherent first hinge 3, a plate shaped anchoring means 12 is provided, said anchoring means extending between the free ends of the first portions 5 of the side elements 1. The plate shaped anchoring means 12 is attached to the first portions 5 of the side elements 1 in a suitable way. Preferably, the plate shaped anchoring means 12 is somewhat curved. The function of the plate shaped anchoring means 12 will be evident from the description below.

At the free ends of the second portions 7 of the side elements 1 a foot step 13 is provided, said foot step 13 being connected to the free ends of the second portions 7 by means of second hinges 14. Thus, the foot step 13 extends generally transverse to the longitudinal direction of the second portions 7. Regardless if the footrest according to the present invention is in active or inactive position the length of the two second portions should in principle be the same. The reason therefore is that on one hand the foot step 13 normally should be horizontal and on the other hand that the hinges 14 should function in a satisfying way.

As is evident from FIGS. 1–4 the footrest according to the present invention may on one hand assume an active position, see FIGS. 1 and 3, and on the other hand a folded position, see FIGS. 2 and 4. The position shown in FIGS. 1 and 3 is the normal position of use for the footrest according to the present invention, i.e. the foot step 13 is located at an essentially lower level than the plate shaped supporting means 10. The folded position, shown in FIGS. 2 and 4, of the footrest according to the present invention may constitute an active position, i.e. if the child in the child safety seat for some reason wants its legs to hang in the air. However, the folded position according to FIGS. 2 and 4 normally constitutes a position for transport or storing.

In FIG. 5 it is shown how the footrest according to the present invention normally is used. As is evident from FIG. 5 the footrest according to the present invention is mounted below a child safety seat 20, in which a child 21 is seated. In such a case the plate shaped supporting means 10 will rest against the upper side of a seat 22. The lower side of the child safety seat 20 will rest against the side elements 1 and the plate shaped supporting means 10 of the footrest according to the present invention.

It is also evident from FIG. 5 that the plate shaped anchoring means 12 is inserted in the space between the upper side of the seat 22 and the lower side of a backrest 23. In FIG. 5 this space is designated by 24. The curved shape of the anchoring means 12 brings about that normally there is an adaption to the shape of the part of the seat that the anchoring means cooperate with. The friction that acts upon the anchoring means 12 from the surrounding parts, i.e. the upper side of the seat 22 and the lower side of the backrest 23, will contribute in keeping the footrest according to the present invention in its position. The friction that acts upon the plate shaped supporting means 10 from on one hand the upper side of the seat 22 and on the other hand from the lower side of the child safety seat contributes to a further degree in keeping the footrest according to the present invention in its position. In this connection it should be considered that when a child 21 is seated in the child safety seat 20 the friction in question will increase.

As is evident from FIG. 5 the child 21 in the child safety seat 20 rests its feet against the foot step 13, said foot step 13 may be angled in the desired way via the hinged attachment to the second portions 7 of the side elements 1. In connection therewith the length of the second portions 7 of each side element 1 has been adjusted in order to bring the foot step 13 to a height that is suitable for the child 21 seated in the child safety seat 20. The child 21 and the child safety seat 20 are preferably fastened by means of an ordinary seat belt 25 in the car.

In connection with the seating of the child 21 in the child safety seat 20 or the descending of the child 21 from the child safety seat 20 the child 21 normally steps on the foot step 13. In such a case it is of outmost importance that the footrest according to the present invention does not turn over in connection with the load that the child applies to the foot step 13. The plate shaped anchoring means 12, that is inserted in the space 24, guarantees that the footrest according to the present invention does not turn over in connection with the above described load on the foot step 13.

During certain circumstances there might be a certain risk that the footrest according to the present invention is subjected to a force directed forwards, e.g. in connection with a frontal collision that involves the car having a footrest according to the present invention. In such a case the friction that during normal conditions keeps the footrest in its position may be insufficient, i.e. the friction acting upon the supporting means 10 and the anchoring means 12. This brings about that the footrest according to the present invention is displaced forward in the travelling direction of the car. For instance the plate shaped supporting means 10 may then injure the lower-legs of the child 21, see FIG. 5. To eliminate this risk the footrest according to the present invention may be equipped with an extra safety arrangement as shown in FIG. 6. As is evident from FIG. 6 the footrest according to the present invention is equipped with a belt 15 that extends between the first portions 5 of each side element 1. In case the footrest according to the present invention is equipped with a belt 15 according to FIG. 6 the footrest is mounted in a corresponding way as shown in FIG. 5. The belt 15 is then tightened around the child safety seat 20, in the area of the transition between seat and backrest of the child safety seat 20. The child 21 will have the belt behind/below itself in the area of the end of the back/the bottom. By such an arrangement the footrest according to the present invention is fixed to the child safety seat, which means that the footrest according to the present invention may not be displaced forward relative to the child safety seat, for instance in connection with a frontal collision.

Figure 9:
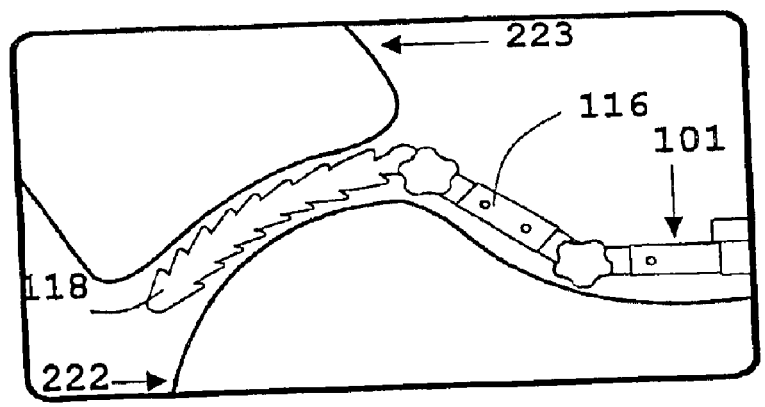
FIG. 9 shows a detail of an alternative arrangement of the anchoring means.

In FIGS. 7–9 an alternative embodiment of the footrest according to the present invention is disclosed, said embodiment having a different design of the anchoring means 112. As is evident from FIGS. 7–9 the anchoring means 112 comprises two tubular elements 116 that each are connected to a respective side element 101 via a first hinge 117. The hinge 117 is of the type that allows the elements 116 to be angled relative to the adherent side element 101 and locked in a desired position relative to the side element 101. The ends of the elements 116 that faces away from the first hinge 117 are hingedly connected to a plate shaped element 118, said hinge connection being effected by locking screws 119 that connect the elements 116 and the plate shaped elements 118 and simultaneously the plate shaped element 118 may be locked in the desired position relative to the tubular elements 116. The plate shaped element 118 is somewhat curved.

In FIG. 8 it is shown how the anchoring means 112 is mounted between a backrest 123 and a seat 122. In such a case the tubular elements 116 are located between the seat 122 and the backrest 123 while the plate shaped element 118 is turned upwards and extends along the backside of the backrest 123. Thereby, a further improved anchoring of the footrest according to the present invention is achieved as regards the prevention of forward displacement of the footrest, e.g. in connection with a collision.

In FIG. 9 it is shown how the anchoring means 112 is mounted between a backrest 223 and a seat 222 having different design compared to the seat shown in FIG. 8. The seat 222 has an elevated portion in the area where the back rest 223 meets the seat 222. In order to adapt the anchoring means 112 to the design according to FIG. 9 between the backrest 223 and the seat 222 the tubular elements 116 are angled upwards relative to the side elements 101 and the plate shaped element 118 is located between the backrest 223 and the seat 222. As is most evident from FIGS. 8 and 9 the plate shaped element 118 is equipped with barbs that in the embodiment shown in FIG. 9 counteract the displacement forward of the footrest, e.g. in connection with a collision.

FEASIBLE MODIFICATIONS OF THE INVENTION

In the embodiment described in FIGS. 1–4 the anchoring means 12 is plate shaped. However, within the scope of the present invention alternative designs of the anchoring means are possible. In exemplifying and non-restricted purpose it may be mentioned that the anchoring means constitutes in principle only two rods, i.e. that the plate according to the embodiment of FIGS. 1–4 is deleted. Within the scope of the present invention it is possible to design the free ends of the first portions 5 to be equipped with hooks, this further increases the possibility of the footrest to be maintained in the position shown in FIG. 5.

In the embodiment described above according to FIGS. 1–4 the first portions 5 of the side elements 1 have fixed lengths. However, it is beneficial for the invention if the first portions 5 have an adjustable length for adaption to the depth of the seat that the footrest is mounted on. In connection therewith the first portions 5 may be telescopic in substantially the corresponding way as the second portions 7.

In the above described embodiment according to FIG. 6 the belt 15 passes the seating space in the child safety seat 20. However, within the scope of the invention it is also feasible that the belt 15 cooperates with fastening means on the outside of the child safety seat.

As an alternative to the belt 15 it is feasible that velcro tapes are attached on one hand to the upper side of the supporting means 10; 110 and on the other hand on the lower side of the child safety seat 20, said velcro tapes being brougth into engagement with each other when the child safety seat 20 is placed upon the supporting means 10; 110 of the footrest according to the present invention.

What is claimed is:

1. A footrest for a child safety seat, comprising:
   a support member that supports a child safety seat;
   a footstep connected to the support member; and
   an anchor insertable between a vehicle seat and a vehicle backrest, said anchor comprises at least one tubular element and a plate shaped element hingedly connected to a first end of the at least one tubular element, a second end of said tubular element being hingedly connected to said support member.

2. The footrest according to claim 1, wherein a distance between the anchor and the footstep is adjustable.

3. The footrest according to claim 1, wherein the support member comprises a pair of substantially parallel tubular elements and a substantially planar support element extending between said pair of tubular elements.

4. The footrest according to claim 1, wherein the plate shaped element is curved.

5. The footrest according to claim 4, wherein at least one surface of the anchor is barbed.

6. The footrest according to claim 1, further comprising a belt attached to the footrest, said belt being connectable to the child safety seat to prevent movement of the footrest with respect to the child safety seat.

7. The footrest according to claim 1, wherein said footstep is adjustable at least to a length of a leg of a child seated in the child safety seat.

* * * * *